United States Patent Office.

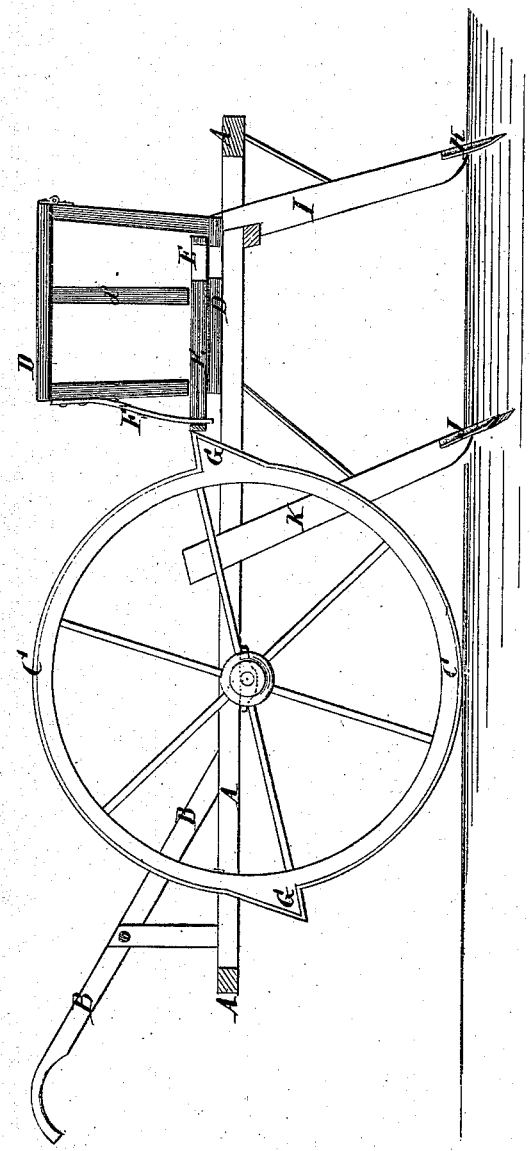

JOHN G. FETZER, OF BRUNSWICK, MISSOURI, ASSIGNOR TO HIMSELF AND A. H. FETZER, OF SAME PLACE.

Letters Patent No. 103,315, dated May 24, 1870.

IMPROVEMENT IN CORN-PLANTERS.

The Schedule referred to in these Letters Patent and making part of the same

*To all whom it may concern:*

Be it known that I, JOHN G. FETZER, of Brunswick, in the county of Chariton and State of Missouri, have invented a new and useful Improvement in Corn-Planter; and I do hereby declare that the following is a full, clear, and exact description thereof, which will enable others skilled in the art to make and use the same, reference being had to the accompanying drawings forming part of this specification, in which—

The figure is a vertical longitudinal section of my improved corn-planter.

My invention has for its object to furnish an improved corn-planter, which shall be simple in construction and effective in operation, and which shall, at the same time, be so constructed and arranged as to enable the corn to be planted accurately, without its being necessary to mark out the ground; and It consists in the construction and combination of various parts of the machine, as hereinafter more fully described.

A is the frame of the planter, to the rear part of which the handles B are securely attached, and which is supported by and rides upon the axle of the drive-wheel C.

D is the hopper, which is divided into two compartments by the partition d', the rear and larger compartment being designed to receive the seed, and the front and smaller compartment having a hole formed through its bottom, through which the seed drops to the ground as it is brought out of the rear compartment by the dropping-slide E.

The dropping-slide E, which works upon the bottom of the hopper D, has a hole formed in it, of such a size as to contain enough seed to form a hill, which hole is so placed that, as the slide moves forward, it may come over the hole in the bottom of the forward compartment of the hopper, and drop the seed through said hole to the ground.

The rear end of the slide E projects in the rear of the hopper D, and the said slide is drawn back, after dropping the seed into its former position, by a spring, F, the lower end of which is connected with the rear end of the said slide, and the upper end of which is attached to the rear side of the hopper D.

The slide E is forced forward, to drop the seed, by the inclined projections or cams G, formed upon or attached to the rim of the drive-wheel C. One, two, or more of the cams G are formed upon or attached to the rim of the wheel C, according to the size of the wheel, and the required distance apart of the hills.

The furrow to receive the seed is opened by the plow H, attached to the lower end of the standard I, the upper end of which is securely attached to the forward part of the frame A.

The seed is covered by the plows J, attached to the lower ends of the standards K, the upper ends of which are attached to the frame A.

The planter may be constructed to plant one, two, or three rows at a time, as may be desired, as many sets of the wheels, hoppers, &c., being used as it is desired to have the machine plant rows, each wheel being provided with its own hopper and set of plows.

Having thus described my invention,

I claim as new and desire to secure by Letters Patent—

The combination of the inclined projections or cams G, dropping-slide E, and spring F with the wheel C, hopper D d', furrowing-plow H I, covering-plows J K, and frame A, substantially as herein shown and described, and for the purpose set forth.

JOHN G. FETZER.

Witnesses:
W. D. MANZEY,
I. A. KEYTE.